US008573908B2

(12) United States Patent
Imanishi et al.

(10) Patent No.: US 8,573,908 B2
(45) Date of Patent: Nov. 5, 2013

(54) MACHINING CENTER INCLUDING A CONTROL BOARD ARRANGED SIDE BY SIDE WITH AN OPERATOR DOOR

(75) Inventors: Kozo Imanishi, Anjo (JP); Yasukazu Yamaguchi, Chiryu (JP); Yasutaka Uchimura, Tsurugashima (JP); Masanao Kato, Kariya (JP)

(73) Assignees: JTEKT Corporation, Osaka-shi (JP); Mitsui Seiki Kogyo Co., Ltd., Hiki-gun (JP)

( * ) Notice: Subject to any disclaimer, the term of this patent is extended or adjusted under 35 U.S.C. 154(b) by 790 days.

(21) Appl. No.: 12/740,029

(22) PCT Filed: Oct. 23, 2008

(86) PCT No.: PCT/JP2008/069261
§ 371 (c)(1),
(2), (4) Date: Jun. 30, 2010

(87) PCT Pub. No.: WO2009/057508
PCT Pub. Date: May 7, 2009

(65) Prior Publication Data
US 2010/0266355 A1    Oct. 21, 2010

(30) Foreign Application Priority Data
Oct. 31, 2007 (JP) ................................. 2007-284472

(51) Int. Cl.
*B23C 1/027* (2006.01)
*B23C 1/06* (2006.01)
*B23C 1/14* (2006.01)

(52) U.S. Cl.
USPC ........... 409/167; 409/166; 409/134; 409/159; 409/235; 29/33 P; 29/563; 198/345.3; 198/346.1; 408/234; 408/241 G

(58) Field of Classification Search
USPC ............ 29/33 P, 563; 483/3, 14, 15; 409/134, 409/145, 158, 159, 162, 164, 165, 166, 167, 409/172, 235; 408/234, 241 G; 198/345.3, 198/346.1
See application file for complete search history.

(56) References Cited

U.S. PATENT DOCUMENTS 3,824,892 A * 7/1974 Bondie et al. ................. 409/164
4,673,076 A * 6/1987 Mattson ..................... 198/346.2
(Continued)

FOREIGN PATENT DOCUMENTS

JP          55112753 A *  8/1980     ............. B23Q 39/00
JP          3 121731          5/1991
(Continued)

*Primary Examiner* — David Bryant
*Assistant Examiner* — Jason L Vaughan
(74) *Attorney, Agent, or Firm* — Oblon, Spivak, McClelland, Maier & Neustadt, L.L.P.

(57) ABSTRACT

A machining center wherein improved workability of a control board, a widened movable zone of a column and a reduced installation space are achieved. The machining center includes a column movably supported on a column sliding portion in an X-axis direction, a work table movably supported on a table sliding portion in a Z-axis direction, a main spindle head slidably supported on the column in a Y-axis direction, and an automatic tool changer disposed at an inner side of the column sliding portion. The control board is arranged at an opposite side of the automatic tool changer and is provided in parallel with a side surface of a front portion of a table sliding portion and is arranged side by side with an openable/closable door for an operator provided on a side surface of a cover in a vicinity of a rear end portion of the side surface of the table sliding portion.

9 Claims, 2 Drawing Sheets

(56) References Cited

U.S. PATENT DOCUMENTS

Figure 1:
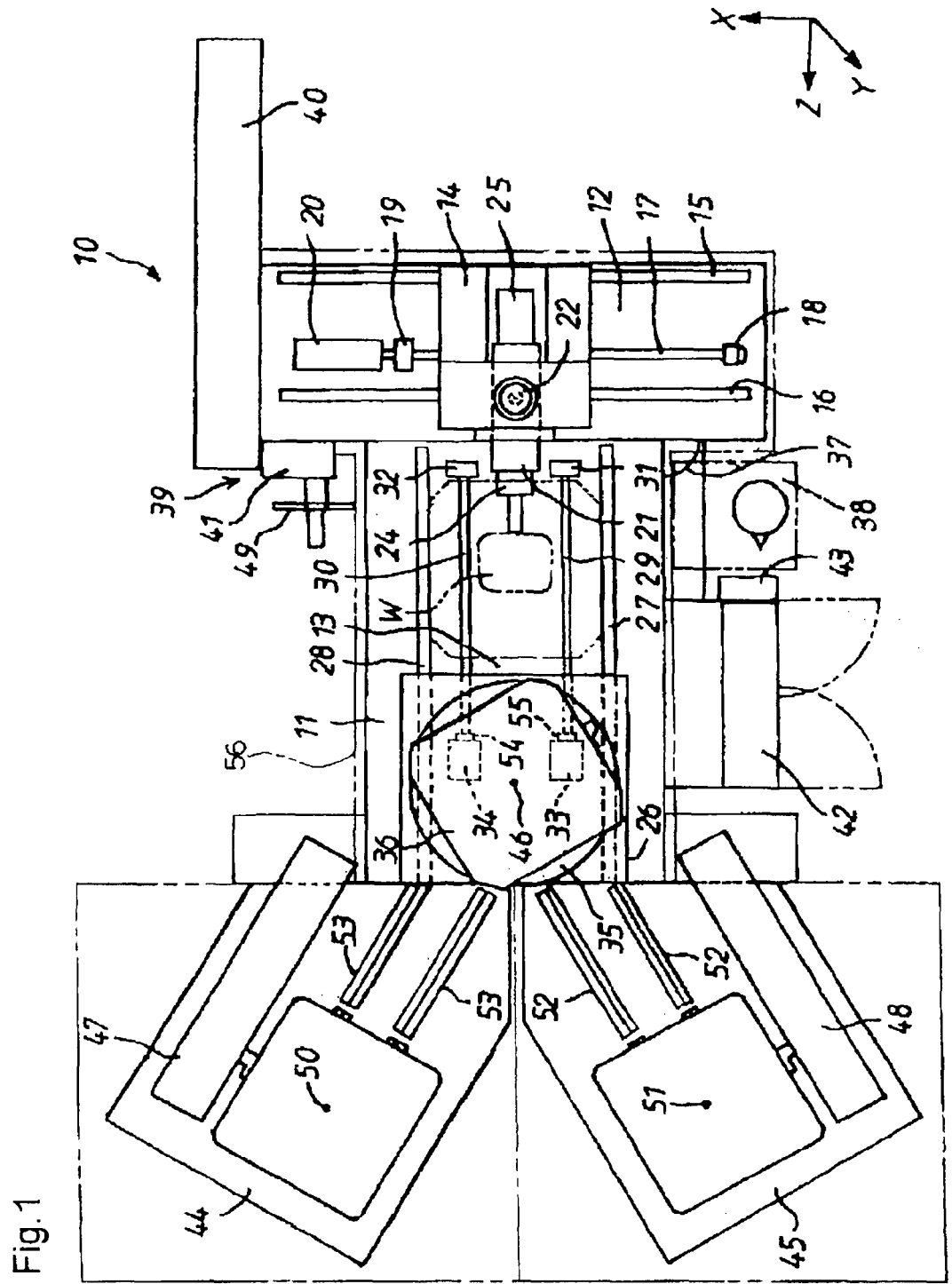

| | | | |
|---|---|---|---|
| 4,970,765 A * | 11/1990 | Sakawa et al. | 29/33 P |
| 4,999,895 A * | 3/1991 | Hirose et al. | 29/33 P |
| 5,261,147 A * | 11/1993 | Wood, III | 29/33 P |
| 5,265,497 A | 11/1993 | Curless | |
| 5,933,933 A * | 8/1999 | Fritz et al. | 29/33 P |
| 6,082,939 A * | 7/2000 | Nakashima et al. | 409/134 |
| 6,193,048 B1 * | 2/2001 | Keith | 198/346.1 |

FOREIGN PATENT DOCUMENTS

| | | | | |
|---|---|---|---|---|
| JP | 4 8448 | | 1/1992 | |
| JP | 11 33854 | | 2/1999 | |
| JP | 2000176784 A | * | 6/2000 | B23Q 11/08 |
| JP | 2002 337032 | | 11/2002 | |
| JP | 2007 152506 | | 6/2007 | |

\* cited by examiner

MACHINING CENTER INCLUDING A CONTROL BOARD ARRANGED SIDE BY SIDE WITH AN OPERATOR DOOR

TECHNICAL FIELD

This invention relates to an arrangement of a control board and an operation board of a machining center.

BACKGROUND OF THE TECHNOLOGY

Generally, in an arrangement of a machining center, since a control board for controlling the machine occupies a larger space, it is usually arranged in the rear area of the machine and since an operation board for operating the machine by sending or receiving information to or from the control board is normally arranged in the vicinity of the right side of an operator who operates the machine, the operation board is separately positioned from the control board.

The relative arrangement of the operation board with the position of the operator is important. In a conventional machining center, a tool magazine of the tool change device for storing various tools is arranged side by side with the bed at the innermost end of the movable zone of a column which slides on a bed in a X-axis direction and is arranged in parallel with a Z-axis in which direction a table moves. Considering the operator's workability, the position of the operator is set at the opposite side of the tool magazine across the table.

In a device disclosed in a description of U.S. Pat. No. 5,265,497, in order to satisfy both requirements of an arrangement of the control board requiring a larger space and an arrangement of the operation board to be closer to the operator and preferable to be in a short distance to the control board to shorten the wiring therebetween, the control board is arranged, in parallel with the Z-axis, at the front side of the movable zone of the column which slides on the bed in the X-axis direction and the operation board is arranged at the side of the control board facing the operator.

The pallet exchanger for exchanging a pallet on which a machined workpiece is attached and a pallet on which an unmachined workpiece is attached between the table moved to the pallet exchanging position and the device for attaching/detaching the workpiece is arranged side by side with the front portion of the bed opposite to the rear portion thereof, on which the column slides. The pallet exchanger holds the pallet on which the machined workpiece is attached and the pallet on which the unmachined workpiece is attached at both sides of the exchanger arm and exchanges the pallets by rotating the exchanger arm 180 degrees around. The rotation locus of the pallet to be exchanged extends sideway of the front portion of the bed. Accordingly, for this reason, the control board is also arranged in parallel with Z-axis at the front side of the movable zone of the column which slides in the X-axis direction.

DISCLOSURE OF INVENTION

Problems to be Solved

However, according to the above conventional machining center, since the control board with the operation board and the tool magazine are arranged so as to sandwich the rear portion of the bed on which column slides in the X-axis direction, the length of the X-axis direction which includes a length of the rear portion of the bed in addition to the thickness of the control board becomes large. This will eventually lead to the increase of the installation area of the machining center. If the length in the X-direction is set to be small, the movable zone of the column in the X-axis direction becomes small. Further, the machining center provided with the control board in parallel to the rear portion of the bed is elongated in the X-axis direction, which may create a problem of delivery. In other words, it is difficult to load the delivery trailer with the machining center with the control board integrally assembled therewith upon shipping. Still further, there exists a need that the position of the control board is preferably arranged at the left side of the operator so as to improve the workability of the machining center when the operator performs the setting up work around the main spindle with opening the openable/closable door for operator.

The present invention was made in consideration with the above problems and the object of the invention is to provide a machining center which can improve the workability of the control board for the operator and further the workability of the machining center as a whole, to provide a wide movable zone of the column and yet to reduce the installation space for the machining center by properly arranging the control board and the operation board.

Means for Solving the Problem

The machining center of the present invention in a first aspect to solve the above conventional problems features that the machining center comprises a bed including a column sliding portion extending in a horizontal X-axis direction and a table sliding portion extending in a horizontal Z-axis direction at right angles with the X-axis and T-intersecting with the column sliding portion at a rear end portion, a column movably supported on the column sliding portion of the bed in an X-axis direction, a main spindle head slidably supported on the column in a Y- axis direction at right angles with a horizontal surface and rotatably supporting a main spindle to which a tool is detachably attached, a work table movably supported on the table sliding portion of the bed in a Z-axis direction, an openable/closable door for operator provided on a side surface of a cover for covering a main body of the machining center in the vicinity of the rear end portion of the side surface of the table sliding portion, and a control board provided in parallel with a side surface of a front portion of the table sliding portion and arranged side by side with the openable/closable door for operator.

The machining center of this invention in a second aspect features that, in the first aspect, the operation board is provided on the control board at the openable/closable door for operator side.

The machining center of this invention in a third aspect features that, in the first aspect, further including a rotary table supported on the work table to be capable of indexably rotating about an axial line in parallel with the Y-axis and adapted to detachably secure a pallet on which a workpiece is detachably attached, a first workpiece attaching/detaching device and a second workpiece attaching/detaching device provided side by side with each other in the X-axis direction and arranged adjacent to a front end edge of the table sliding portion for attaching or detaching the workpiece to or from the pallet, and a first pallet carrying in/out device and a second pallet carrying in/out device provided with an inclination in an acute angle direction relative to the Z-axis on both sides thereof, respectively for carrying in or out the pallet between the rotary table supported on the work table which has been moved to a pallet exchange position provided at a front end portion of the table sliding portion and the first and the second workpiece attaching/detaching devices, wherein the control board is provided between the first or second pallet carrying in/out device and a side surface of the column sliding portion.

The machining center of this invention in a fourth aspect features that, in the first aspect, further including an automatic tool changer having a tool magazine for storing a plurality of tools and a tool change mechanism for exchanging the tools between the tool magazine and the main spindle, wherein the automatic tool changer is provided at the opposite side of the openable/closable door for operator across the bed.

The Effects of the Invention

According to the invention, the column is movably supported on the column sliding portion of the bed in the X-axis direction, the work table is movably supported on the table sliding portion in the Z-axis direction and the main spindle head is movably supported on the column in the Y-axis direction. The control board is arranged in parallel with a side surface of the front portion of the table sliding portion and arranged side by side with the openable/closable door for operator provided on the side surface of the cover for covering the main body of the machining center in the vicinity of the rear end portion of the side surface of the table sliding portion. Thus, since the control board is arranged side by side and in parallel with the side surface of the front portion of the table sliding portion, the width of the machining center as a whole in the X-axis direction can be shortened even if the movable distance of the column in the X-axis direction is elongated, and thereby the installation area of the machining center can be reduced.

Further, since the control board is arranged in parallel with the side surface of the front portion of the table sliding portion and arranged side by side with the openable/closable door for operator provided on the side surface of the cover for covering the main body of the machining center in the vicinity of the rear end portion of the side surface of the table sliding portion. Since the operation board is provided on the control board at the openable/closable door for operator side thereof, the effects achieved by the structure of the claim 1 can be obtained here and at the same time, the operator can operate the operation board with facing thereto in front of the operator's body, observing the workpiece on the work table that slides on the table sliding portion in a natural attitude, without necessitating turning around movement as has been the case in a conventional machining center. Further, since the control board and the operation board can be formed integrally, the wiring for connecting therebetween can be shortened and the manufacturing cost can be reduced accordingly.

Yet further, since the first and the second pallet carrying in/out devices are arranged to be extending with an acute angle in an inclination direction relative to the Z-axis on both sides thereof to form a V-shape thereby creating a large space at the left side of the operator's operation position. Accordingly, the control board can be surely arranged in the enlarged space, in other words, at the side position of the front portion of the table sliding portion of the machining center. And, the operation board can be arranged on the side surface of the control board so as to face towards the operation position of the operator.

finally, since the machining center includes the automatic tool changer having the tool magazine for storing the plurality of tools and the tool change mechanism for exchanging the tools between the tool magazine and the main spindle, wherein the automatic tool changer is arranged at the inner side of the column sliding portion so as to secure the openable/closable door for operator and the operator's operation position at the opposite side of the automatic tool changer across the bed, and thereby the control board can be arranged at the left side of the door for operator and the operation position.

BRIEF EXPLANATION OF ATTACHED DRAWINGS

Figure 2:
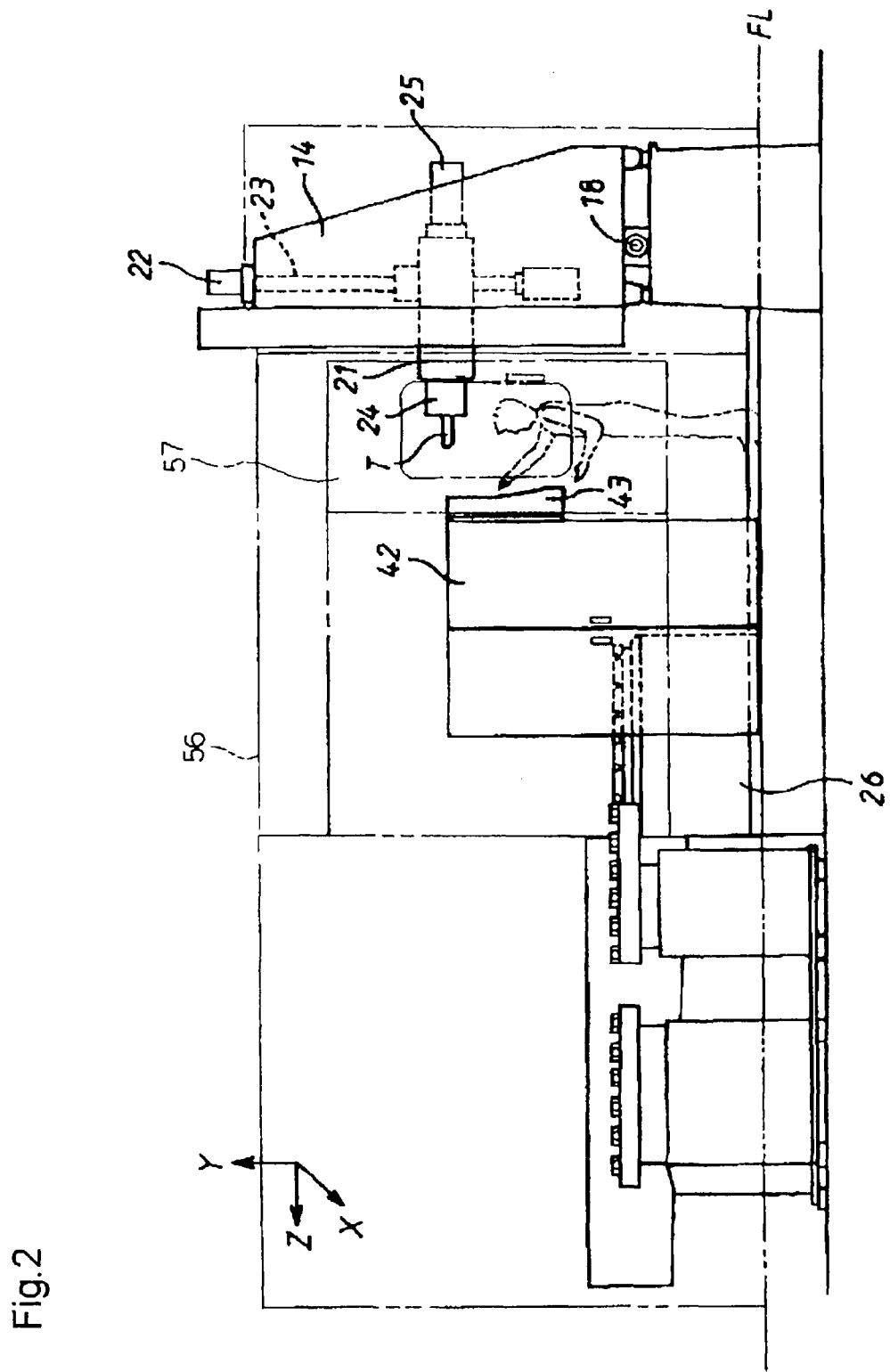

FIG. 1 is a plain view of a machining center according to an embodiment of the present invention.
FIG. 2 is a side view of the machining center.

EXPLANATION OF REFERENCE NUMERALS

10; machining center, 11; bed, 12; column sliding portion, 13; table sliding portion, 14; column, 20; X-axis servomotor, 21; main spindle head, 22; Y-axis servomotor, 24; main spindle, 25; main spindle servomotor, 26; work table, 33, 34; Z-axis servomotor, 35; rotary table, 36; pallet, 37; inner corner portion, 38; operation position, 39; tool changer, 40; tool magazine, 41; tool change mechanism, 42; control board, 43; operation board, 44, 45; first and second workpiece attaching/detaching devices, 46; pallet exchange device, 47, 48; first and second pallet carrying in/out devices, 56; cover, 57; door for operator, T; tool, W; workpiece

THE BEST MODE EMBODIMENTS OF THE INVENTION

An embodiment of the invention will be explained hereinafter with reference to the attached drawings of FIG. 1 and FIG. 2. Numeral 11 designates a bed for a machining center 10 and the bed 11 is installed in a pit dug from the floor surface FL. The bed 11 is integrally formed by a column sliding portion 12 extending in a horizontal X-axis direction and a table sliding portion 13 extending in a horizontal Z-axis direction at right angles to the X-axis. The table sliding portion 13 intersects with the column sliding portion 12 to form a T-shape therewith at the rear portion and is integrally formed with the column sliding portion 12.

A column 14 is movably supported on the column sliding portion 12 of the bed 11 in an X-axis direction. A pair of guide rails 15, 16 is fixed on the upper surface of the column sliding portion 12 and is extending in a horizontal X-axis direction in parallel with each other and the column 14 slides along the column sliding portion 12 in an X-axis direction with being guided by the pair of guide rails 15 and 16. A ball screw shaft 17 is rotatably supported on the bed 11 via bearings 18 and 19 at both ends between the guide rails 15 and 16 and is extending in an X-axis direction. One end (inner side end) of the ball screw shaft 17 passes through the bearing 19 and connected to an X-axis servomotor 20. A nut is fixed to an underside surface of the column 14 and engages with the ball screw shaft 17. The column 14 is moved in an X-axis direction by the rotation of the ball screw shaft driven by the X-axis servomotor 20.

A main spindle head 21 is supported on the column 14 and is slidable in a Y-axis direction which is perpendicular to the horizontal surface and is movable in an up/down direction by a Y-axis servomotor 22 via another ball screw shaft 23. A main spindle 24 is rotatably supported on the main spindle head 21 and a tool T is detachably attached to the main spindle 24. The main spindle 24 is rotated by a main spindle servomotor 25.

A work table 26 is supported on the table sliding portion 13 of the bed 11 and is slidable in a Z-axis direction. A pair of guide rails 27 and 28 is fixed on the upper surface of the table sliding portion 13 and is extending in a horizontal Z-axis direction in parallel with each other and the work table 26 slides on the table sliding portion 13 in the Z-axis direction with being guided by the pair of guide rails 27 and 28. Ball screw shafts 29 and 30 are rotatably supported on the bed 11 via bearings 31, 32, 54 and 55 at both ends and disposed inside of the guide rails 27 and 28. The ball screw shafts 29 and 30 extend in the Z-axis direction. As viewed in FIG. 1, respective left side ends of the ball screw shafts 29 and 30 pass through respective left side bearings 54 and 55 and connected to Z-axis servomotors 33 and 34. Nuts are fixed to an underside surface of the work table 26 and engage with the ball screw shafts 29 and 30. The work table 26 is moved in a Z-axis direction by the rotations of the ball screw shafts 29 and 30 driven by the Z-axis servomotors 33 and 34.

A rotary table 35 is supported on the work table 26 and is indexably rotatable about an axial line parallel with the Y-axis. The rotary table is indexably rotated by a servomotor via reduction gear mechanism (not shown). A pallet clamp device (not shown) is provided on the rotary table 35 for positioning and clamping a pallet 36 carried in. A workpiece W to be machined is detachably attached on the pallet 36.

The bed 11, the column 14 and the work table 26, etc. are covered by a cover 56. and a machining space is provided inside of the cover 56 and the space is secluded from the exterior. An openable/closable door 57 for operator is provided on a side surface of the cover 56 in the vicinity of the rear end portion of the side surface of the table sliding portion 13.

An operation position 38 for the operator is provided at the left side of an inner corner portion 37 formed at the intersection between the side surface of the table sliding portion 13 and the front side surface of the column sliding portion 12 of the bed 11. A tool changer 39 is provided at the inner end of the column sliding portion 12 opposite to the operation position 38 and the door 57 for operator across the bed 11. The tool changer 39 includes a tool magazine 40 for storing a plurality of tools T and a tool change mechanism 41 for exchanging the tools T between the tool magazine 40 and the main spindle 24. The tool magazine 40 is provided side by side with the inner end portion of the column sliding portion 12 in a Z-axis direction and the tool change mechanism 41 is provided at the front side of the inner end portion of the column sliding portion 12.

A control board 42, accommodating therein a control device for controlling the rotations of the X-axis, the Y-axis, the Z-axis and the main spindle servomotors 20, 22, 23, 33, 34 and 25, etc. is arranged in parallel with a side surface of a front portion of the table sliding portion 13 and is arranged side by side with the openable/closable door 57 for operator which is provided on a side surface of the cover 56 for covering a main body of the machining center in the vicinity of the rear end portion of the side surface of the table sliding portion 13. An operation board 43 is provided on the control board 42 at the openable/closable door for operator side thereof facing to the operation position 38. The operation board 43 is provided with devices such as switches handled by the operator and a display for monitoring the situation of the machining center operation and is wired with the control board 42 and so forth.

First and second workpiece attaching/detaching devices 44 and 45 are provided adjacent to the front end edge of the table sliding portion 13 and arranged side by side therewith in an X-axis direction. The first and the second workpiece attaching/detaching devices or stations 44 and 45 are for detaching a machined workpiece W from the pallet 36 and for attaching an unmachined workpiece W to the pallet 36.

The work table 26 is moved to a pallet exchange position 46 provided at the front end of the table sliding portion 13 after the machining operation on the workpiece W has been completed. A first and second pallet carrying in/out devices 47 and 48 are respectively provided with inclinations in acute angle directions with respect to the Z-axis on both sides thereof to form a V-shape. The first and the second pallet carrying in/out devices 47 and 48 carry in or out the pallet 36 between the rotary table 35 on the work table 26 positioned to the pallet exchange position 46 and the first and the second workpiece attaching/detaching devices 44 and 45.

Next, operation of the machining center 10 according to the embodiment will be explained hereinafter. The operator first confirms the condition or state of the workpiece which has been mounted on the rotary table 35, with standing at the operation position 38 and then pushes a start switch provided on an operation board 43. Then, the NC data memorized in a CNC device accommodated in the control board 42 are read sequentially, and thereby the main spindle 24 is rotated by the main spindle servomotor 25, and the column 14, the main spindle head 21 and the work table 26 are moved by the X-axis, Y-axis and Z-axis servomotors 20, 22, 33 and 34 to machine the workpiece W by the tool T.

While the workpiece is being machined, in the tool magazine 40, the tool to be used next is indexed to a tool exchange position and the indexed tool is turned by a swivel mechanism to be in parallel with the Z-axis and then waits for the next use at the stand-by position. After the completion of the machining by the first tool T, the rotation of the main spindle 24 is stopped and the column 14 and the main spindle head 21 are moved to the tool exchange position where the main spindle 24 and the tool change mechanism 41 are aligned. Holding devices provided at both ends of an change arm 49 of the tool change mechanism 41 hold a tool T attached to the main spindle 24 and a tool T in the tool magazine 40 at the stand-by position respectively. A tool clamp device provided in the main spindle 24 unclamps the tool T, the change arm 49 advances and swivels 180 degrees around, and then retreats to mount another tool T to be used next to the main spindle 24. When the tool T to be used next is mounted to the main spindle 24 and clamped by the clamp device, the column 14, main spindle head 21 and the work table 26 are moved to machine the workpiece W by the newly attached tool T.

By the repetition of the series of such processing, the machining of the workpiece W is completed. After the completion of the machining, the work table 26 is moved to position at the pallet exchange position 46 by the Z-axis servomotors 33 and 34. The rotary table 35 is rotated to be positioned where the attached pallet 36 faces the second workpiece attaching/detaching device 45 at the pallet exchange position 46 and then a pallet clamp device unclamps the pallet 36. An engaging portion of the second pallet carrying in/out device 48 advances to engage with an engaging portion of the pallet 36 and then retreats keeping engagement with the pallet 36 to carry out the pallet 36 to a second attaching/detaching position 51 of the second workpiece attaching/detaching device 45. A pair of transfer rails 52, 52 is provided between the pallet exchange position 46 and the second attaching/detaching position 51. Each of the transfer rails 52 includes a plurality of rollers projecting from the upper surface thereof. When the pallet 36 with a machined workpiece W is carried out, the rotary table 35 is rotated to be positioned where the pallet clamp device turns to face the first workpiece attaching/detaching device 44. During the machining of the previous workpiece W, an unmachined workpiece W is attached to the pallet 36 at a first attaching/detaching position 50 of the first workpiece attaching/detaching device 44. An engaging portion of the first pallet carrying in/out device 47 advances to carry in the pallet 36 onto the rotary table 35 from the first attaching/detaching position 50 and then the pallet 36 is clamped by the pallet clamp device. A pair of transfer rails 53, 53 is provided between the first attaching/detaching position 50 and the pallet exchange position 46 and each rail 53 is provided with a plurality of rollers projecting from the upper surface thereof.

It is noted here that an operator may operate the operation board 43 in order to relatively move the tool T and the workpiece W with observing the situation of the machining on the workpiece W by the tool T. Even under such operation, since the operation board 43 is arranged on the control board 42 at the door for operator side of the control board 42, the operator can operate the operation board 43 with facing thereto in front of the operator's body, observing the machining situation in a natural attitude, without necessitating turning around movement as has been the case in a conventional machining center.

Further, since the control board 42 is arranged side by side with the front end side of the table sliding portion 13 of the bed 11 in parallel with each other, even if the movable distance of the column 14 in an X-axis direction is elongated, the whole width of the area including the column sliding portion 12 of the machining center 10 in an X-axis direction can be shortened, which can eventually decrease the installation area of the machining center 10 and makes it possible upon shipping to load the delivery trailer with the machining center 10 wherein the bed is assembled with the control board 42 and the operation board 43.

Industrial Applicability

The machining center according to the invention can be applied to a machining center in which a pallet attached a machined workpiece and a pallet attached an unmachined workpiece are exchanged between a table and a workpiece attaching/detaching device and then the unmachined workpiece is machined by a plurality of tools changably attached to a main spindle.

The invention claimed is:

1. A machining center comprising:
    a bed including a column sliding portion extending in a horizontal X-axis direction and a table sliding portion extending in a horizontal Z-axis direction at right angles with the X-axis and T-intersecting with the column sliding portion at a rear end portion;
    a column having a length in a Z-axis direction, the column being movably supported on the column sliding portion of the bed in an X-axis direction;
    a main spindle head slidably supported on the column in a Y-axis direction at right angles with a horizontal surface and rotatably supporting a main spindle to which a tool is detachably attached;
    a work table movably supported on the table sliding portion of the bed in the Z-axis direction;
    an openable operator door provided on a side surface of a cover for covering a main body of the machining center in the vicinity of the rear end portion of the side surface of the table sliding portion; and
    a control board having a length in a Z-axis direction, the control board being provided in parallel with a side surface of a front portion of the table sliding portion and arranged side by side with the openable operator door, wherein the control board is arranged relative to the column such that no portion of the length of the control board in the Z-axis direction overlaps with any portion of the length of the column in the Z-axis direction.

2. The machining center according to claim 1, wherein an operation board is provided on the control board at the openable operator door side.

3. The machining center according to claim 2, further comprising an automatic tool changer having a tool magazine for storing a plurality of tools and a tool change mechanism for exchanging the tools between the tool magazine and the main spindle, wherein the automatic tool changer is provided at the opposite side of the openable operator door across the bed.

4. The machining center according to claim 1, further comprising an automatic tool changer having a tool magazine for storing a plurality of tools and a tool change mechanism for exchanging the tools between the tool magazine and the main spindle, wherein the automatic tool changer is provided at the opposite side of the openable door operator across the bed.

5. A machining center comprising:
    a bed including a column sliding portion extending in a horizontal X-axis direction and a table sliding portion extending in a horizontal Z-axis direction at right angles with the X-axis and T-intersecting with the column sliding portion at a rear end portion;
    a column movably supported on the column sliding portion of the bed in an X-axis direction;
    a main spindle head slidably supported on the column in a Y-axis direction at right angles with a horizontal surface and rotatably supporting a main spindle to which a tool is detachably attached;
    a work table movably supported on the table sliding portion of the bed in a Z-axis direction;
    an openable operator door provided on a side surface of a cover for covering a main body of the machining center in the vicinity of the rear end portion of the side surface of the table sliding portion; and
    a control board provided in parallel with a side surface of a front portion of the table sliding portion and arranged side by side with the openable operator door, wherein an operation board is provided on the control board at the openable operator door side,
    further comprising:
    a rotary table supported on the work table to be capable of indexably rotating about an axial line in parallel with the Y-axis and adapted to secure a pallet on which a workpiece is detachably attached;
    a first workpiece attaching device and a second workpiece attaching device provided side by side with each other in the X-axis direction and arranged adjacent to a front end edge of the table sliding portion for attaching or detaching the workpiece to or from the pallet; and
    a first pallet carrying in device and a second pallet carrying in device provided with an inclination in an acute angle direction relative to the Z-axis on both sides thereof, respectively for carrying in or out the pallet between the rotary table supported on the work table which has been moved to a pallet exchange position provided at a front end portion of the table sliding portion and the first and the second workpiece attaching devices,
    wherein the control board is provided between the first or second pallet carrying in device and a side surface of the column sliding portion.

6. A machining center comprising:
    a bed including a column sliding portion extending in a horizontal X-axis direction and a table sliding portion extending in a horizontal Z-axis direction at right angles with the X-axis and T-intersecting with the column sliding portion at a rear end portion;
    a column movably supported on the column sliding portion of the bed in an X-axis direction;
    a main spindle head slidably supported on the column in a Y-axis direction at right angles with a horizontal surface and rotatably supporting a main spindle to which a tool is detachably attached;

a work table movably supported on the table sliding portion of the bed in a Z-axis direction;

an openable operator door provided on a side surface of a cover for covering a main body of the machining center in the vicinity of the rear end portion of the side surface of the table sliding portion; and a control board provided in parallel with a side surface of a front portion of the table sliding portion and arranged side by side with the openable operator door, further comprising:

a rotary table supported on the work table to be capable of indexably rotating about an axial line in parallel with the Y-axis and adapted to secure a pallet on which a workpiece is detachably attached;

a first workpiece attaching device and a second workpiece attaching device provided side by side with each other in the X-axis direction and arranged adjacent to a front end edge of the table sliding portion for attaching or detaching the workpiece to or from the pallet; and a first pallet carrying in device and a second pallet carrying in device provided with an inclination in an acute angle direction relative to the Z-axis on both sides thereof, respectively for carrying in or out the pallet between the rotary table supported on the work table which has been moved to a pallet exchange position provided at a front end portion of the table sliding portion and the first and the second workpiece attaching devices, wherein the control board is provided between the first or second pallet carrying in device and a side surface of the column sliding portion.

7. The machining center according to claim 6, further comprising an automatic tool changer having a tool magazine for storing a plurality of tools and a tool change mechanism for exchanging the tools between the tool magazine and the main spindle, wherein the automatic tool changer is provided at the opposite side of the openable operator door across the bed.

8. The machining center according to claim 1, wherein the control board is arranged relative to the column sliding portion such that a width of the control board in the X-axis direction at least partially overlaps a width of the column sliding portion in the X-axis direction.

9. The machining center according to claim 5, further comprising an automatic tool changer having a tool magazine for storing a plurality of tools and a tool change mechanism for exchanging the tools between the tool magazine and the main spindle, wherein the automatic tool changer is provided at the opposite side of the openable operator door across the bed.

* * * * *